(12) United States Patent
Yu

(10) Patent No.: US 8,724,633 B2
(45) Date of Patent: May 13, 2014

(54) INTERNET REAL-TIME DEEP PACKET INSPECTION AND CONTROL DEVICE AND METHOD

(71) Applicant: Wuhan Research Institute of Posts and Telecommunications, Wuhan (CN)

(72) Inventor: Shaohua Yu, Wuhan (CN)

(73) Assignee: Wuhan Research Institute of Posts and Telecommunications, Wuhan (CN)

( * ) Notice: Subject to any disclaimer, the term of this patent is extended or adjusted under 35 U.S.C. 154(b) by 0 days.

(21) Appl. No.: 13/729,203

(22) Filed: Dec. 28, 2012

(65) Prior Publication Data

US 2013/0128742 A1 May 23, 2013

Related U.S. Application Data

(63) Continuation of application No. 12/651,691, filed on Jan. 4, 2010, now Pat. No. 8,369,334.

(30) Foreign Application Priority Data

Jan. 5, 2009 (CN) .......................... 2009 1 0003445
Apr. 30, 2009 (CN) .......................... 2009 1 0138528

(51) Int. Cl.
*H04L 12/28* (2006.01)

(52) U.S. Cl.
USPC ........................................................ 370/392

(58) Field of Classification Search
USPC .................. 370/229–230, 252, 389, 392, 370/395.31–395.32, 395.5–395.52; 709/238; 726/22–23
See application file for complete search history.

(56) References Cited

U.S. PATENT DOCUMENTS

| 7,499,412 | B2 | 3/2009 | Matityahu et al. |
| 7,719,966 | B2 | 5/2010 | Luft et al. |
| 7,784,094 | B2 | 8/2010 | Balakrishnan et al. |
| 7,843,967 | B2 | 11/2010 | Baruah et al. |
| 7,890,991 | B2 | 2/2011 | Kay |
| 2007/0056029 | A1 | 3/2007 | Kay |

FOREIGN PATENT DOCUMENTS

CN 101286937 10/2008

OTHER PUBLICATIONS

First Office Action issued Sep. 22, 2013 from corresponding Chinese Application No. 2009101385284 (14 pages including English translation).

Data Sheet re Arbor Ellacoya el00 Device Specifications by Arbor networks, 4 pages, 2008.

(Continued)

*Primary Examiner* — Frank Duong
(74) *Attorney, Agent, or Firm* — Brinks Gilson & Lione; G. Peter Nichols

(57) ABSTRACT

A deep packet inspection and control device for performing real-time traffic management on a real-time packet data stream over the internet that includes a first rule table unit for storing a rule table including a first set of rule entries which are pre-defined or generated dynamically; a first scanning unit for receiving a first real-time packet data stream from the internet, and scanning the first real-time packet data stream according to a scanning window defined by the first set of rule entries; a first analysis unit for matching the first real-time packet data stream with the first set of rule entries in the scanning window of the first scanning unit, and outputting a matching result; and a first rule linkage unit for performing linkage control on the first real-time packet data stream to be output back to the internet according to the matching result output from the first analysis unit.

20 Claims, 7 Drawing Sheets

(56) References Cited

OTHER PUBLICATIONS

Sable Networks News Release re Scalable Deep-Packet-Inspection S80 and S240 service controllers and relevant SableOS R2.0 software, Jan. 22, 2008, one page.

Sonicwall brochure entitled "10 Cool Things Your Firewall Should Do", 16 pages, 2008.

Allot Communications paper entitled "Digging Deeper into Deep Packet Inspection (DPI)", 12 pages, Apr. 2007.

AdvancedIO® Systems News Release re V3020 entitled "Real-time 10GbE Packet Processing Expertise Powers Intelligent Solutions for Deep Packet Inspection Challenges", three pages, Jun. 17, 2008.

PowerPC™ e500 Core Family Reference Manual, pp. 1-548, Rev. I, Apr. 2005.

OpenPR Press release re PRX-IG and PRX-5G entitled "ipoque Introduces 10 Gigabit Ethernet DPI Solution in a Compact 2U Package", 2 pages, Jun. 2, 2008.

INTERNET REAL-TIME DEEP PACKET INSPECTION AND CONTROL DEVICE AND METHOD

This application is a continuation of U.S. patent application Ser. No. 12/651,691, which claims priority to Chinese patent application CN 200910003445.4 filed on Jan. 5, 2009 and to Chinese patent application CN 200910138528.4 filed on Apr. 30, 2009, the entire contents of each are incorporated herein by reference.

FIELD OF THE INVENTION

The present disclosure relates to traffic management of the internet, and more particularly, to a deep packet inspection and control device and a method for performing real-time traffic management on a real-time packet data stream over the internet.

BACKGROUND OF THE INVENTION

The internet has been in development for about 40 years, and there have been 275 million internet users in China only by the end of year 2008, which has exceeded the USA and taken the first place in the world. Services and various applications of the internet have already become necessary in work and life, especially of the youths. While the internet has expanded quickly in its network scale and makes far-reaching influences on a plenty of aspects such as human social activities, many inherent problems have also been exposed which mainly include unguaranteed on safety and credibility, poor controllability and manageability, unguaranteed on quality of service, poor expandability and so on.

The safety problem and incredibility of the current internet are especially prominent, and have already become one of bottlenecks for the development thereof. Internet safety events that frequently occurred on design, construction, operation administration and maintenance are particular demonstration of internet frangibility, and although events such as numerous leakage of sensitive information, address frauds, junk email flooding and network deception are common, it is impossible to track breakers for most of safety events. Using junk email flooding for example, according to a statistics result of the safety companies, the sending amount of junk emails (spam) increases to 30 to 50 billions every day in year of 2008 worldwide compared to that in 2007. In 2008, the average sending amount of junk emails (spam) reaches to 170 to 180 billions every day. Most of these safety events are related to incredibility of the network. In addition, according to data accumulated by the Websense, 51% of websites that propagated vicious software were legal ones broken down by hackers. One result by the incredibility of the internet is that countries and commons feel worried about the perspective of applying the internet. On one hand, they are worried about placing completely key applications (such as e-government and e-business) on the internet. On the other hand, they do not dare to use key applications (such as internet banking and paying) on the internet. Meanwhile, the safety problems of the internet also influence the healthy development of national economies and even threaten national safety.

In the current internet protocol architecture, the guarantee on peer-to-peer quality of service (QoS) is one issue. The internet provides essentially a connectionless service with "best effort", whose function is merely to send packets to a destination as possible as it can rather than providing any guarantee on quality of service such as bandwidth guarantee, time delay jitter and so on. In a case of data services such as FTP, Email or Web services, the internet may satisfy demands of users substantially. However, for services having relatively higher requirements for network quality of service, such as demands of peer-to-peer voice, real-time stream media transfer and so on, it is difficult for the existing internet to guarantee on quality of service. With a further consideration of dramatic increase of network traffic, problems will be more significant. In the beginning of 1990s, most citizens send text emails each occupying only several bytes, and at that time, the total amount of data transmission each month is just several TB (1 TB=1000 G) in the USA. Nowadays, data traffic in the biggest global video sharing website YouTube is equivalent to 75 billions of emails per day. The traffic of an American video website in one month is currently equivalent to the sum of all traffic from the internet worldwide in year of 2000. Additionally, it is estimated by the American Internet Innovation Alliance that the traffic of the internet will double every 12 months, faster than the result predicted by the Moore's Law.

Capacities for identifying different users and various applications of an existing DPI (deep packet inspection) node device are weakened, but functions such as safety filtering and so on are highlighted greatly. With the importance of the internet getting more and more prominent, demands for identifying different users and various applications by a network device increase gradually, and expectations of monitoring and scheduling network traffic according to the identification result become stronger. It is one of characteristics of the present disclosure that different users and applications are identified by deep packet inspection to achieve functions of node-level control and network-level scheduling.

The problems mentioned above not only constrain the development of the internet itself, but also prevent the promotion of internet deep packet inspection, identification, control and scheduling techniques. Most of these problems are caused by the internet architecture. How to solve these problems is an issue that governments of respective countries are considering and wishing to solve. If significant adjustment and innovation for the internet protocol architecture are made, at least problems of network compatibility and how to protect original huge invest are need to be solved. Another approach is to evolve smoothly and develop gradually, based on which the present disclosure is proposed.

In recent years, internet device providers and safety device manufacturers are researching and developing this kind of products. For example, ARBOR Networks released the Arbor Ellacoya E100, which provides a carrier-class platform and two 10 Gbps DPI modules, supports 20 Gbps capacity and 5000 users, and offers analysis and reports based on streams, bandwidth management, services panning management, allocation management and so on.

Sable Networks released S80 and S240 service controllers as well as the relevant SableOS R2.0 software on January, 2008, which have DPI processing capacity with linear speed in seven levels (layers), are expandable from 10 Gbps to 220 Gpbs and support the Ethernet and the SDH/SONET interfaces. SONICWALL adds DPI functions on the basis of original firewall products, supporting video stream and audio stream management and utilizing functions such as bandwidth priority, P2P low control, anti-virus, anti-intrusion detection, content filtering, partial anti-junk emails (countering spam) and so on. Blade Networks Technologies released a 10 billion-level traffic management solution on the basis of the IBM BladeCenter server platform, and the solution has 60 Gbps processing capacity, can deal with 4.2 million packets per second, 2.4 million concurrent streams and 12 million users, holds capacities of loads balance and bandwidth management based on users and applications as well as seven-level (layer) DPI packet inspection, and has carrier-class credibility and warm backup as well as low time delay jitter for a real-time VOIP service and so on. Allot Communications issued a paper on deeply exploring DPI on April, 2007. The paper considers that the DPI technique may allow service providers to improve performances of IP multimedia services, prevent unnecessary resource consumption and the traffic causing congestion, and also play a role on alleviating network attacks, analyzing behaviors of network traffic, solving network bandwidth bottlenecks, guaranteeing quality of service and so on, which is a new benefit source of operators and ISPs. AdvancedIO Systems issued the V3020, Real-time 10 GbE Packet Processing Expertise Power Intelligent Solutions, based on the MicroTCA platform on June, 2008, to satisfy the market demand for DPI. Freescale Semiconductor released the multi-core communication platform chip E500 by using its original existing network processor technology. Compared with a simple CPU, the E500 is more effective on executing complicated DPI codes, and has certain capacities of anti-virus and anti-hostile attacks. German OpenPR (Worldwide Public Relations) released the PRX-1 and the PRX-5G traffic managers, which may realize the following functions: allowing network operators to monitor and control network traffic according to each application, detecting each kind of applications by combining the seven-level deep packet inspection and behavior-level traffic analysis and supporting bandwidth management based on VLAN, P2P, instant communication IM, VOIP, tunnel, stream media and so on. Performances of the PRX-5G can reach to 6 Mbit/s throughput, process 750 thousand packets per second and support 1 million users. Performances of the PRX-1G can reach to 3.4 Mbit/s throughput, process 550 thousand packets per second and support 250 thousand users.

From the prior art described above, there are some common disadvantages as follows:

1. DPI operates mainly on a unidirectional data stream, and has no operations in the opposite direction. Actually, for a kind of applications like Email (countering spam), the unidirectional DPI is enough. However, for services such as Web, VOIP, games, search engines, real-time multimedia, instant communications (instant messaging), and the like, their operations are bidirectional. Although the traffics caused by operations in both of directions are not symmetric, the forward and the backward directions are highly related which means a relationship of operating and operated, also a relationship of cause and effect, neither of which can be lacked.

2. There lacks interaction, interconnection and interworking mechanisms for network operations among users, network operation maintenance (or ISP) and DPI node. The DPI node is added and controlled by the network operation maintenance (or ISP). The DPI user may set the DPI node at any time to obtain its required identification and control capacities for terminal users and various applications. Such identification and control capacities are demonstrated by value-added services and serve for the user of the DPI node. If the DPI user does not know the existence of DPI, or the DPI user cannot set service functions of the DPI node correspondingly through the network, then the significance and dispensability of the existence of DPI are less.

3. For the in-band mode, the control and management information channel has serious limitations in both of the forward and the backward directions. If the direction forward to the DPI node is deemed as direct, then the direction coming backward has to be a bypass. This leads to inconvenience of control and management of the node device. Otherwise, if the out-band mode is used, the cost will increase.

4. Capacities for identifying different users and various applications of an existing DPI node device are weakened, but functions such as safety filtering and so on are highlighted greatly. With the importance of the internet getting more and more prominent, demands for identifying different users and various applications by a network device increase gradually, and expectations of monitoring and scheduling network traffic according to the identification result become stronger. It is one of characteristics of the present disclosure that different users and applications are identified by deep packet inspection to achieve functions of node-level control and network-level scheduling.

5. One of the purposes of adding a DPI node is to solve or partially solve the problem of "peer-to-peer quality of service (QoS) guarantee" for services. Specifically, (1) an VIP user is given a high priority when a specific packet is waiting in a queue at the present DPI node; (2) an associated real-time service is given a high priority when a specific packet is waiting in a queue at the present node; (3) before a packet leaves the present node to be sent to a next node, the TOS field of an IP header is modified according to the importance of the service type and the user, to have a higher priority or lower priority; (4) give a specific route for a specific route, which needs a DPI node to negotiate and consist with other router nodes on the path from end to end, wherein other router nodes should consider the DPI node as a similar router node from the perspective of data delivery and control signaling, that is, this kind of DPI node also has a function of the router node or a DPI function is added to the existing router node; (5) for a specific real-time service, in order to ensure the consistence of time delay jitter, modification is performed on an output-queue before a packet leaves an DPI node, to make the time delay when this kind of packets pass through the present DPI node be an approximately constant value.

From the existing solutions above, it is difficult for the architecture thereof to support (3), (4) and (5), so this is a deficiency of the design.

SUMMARY OF THE INVENTION

The present disclosure is aimed at gradually increased various safety problems and incredibility events, node-level control and network-level scheduling and poor peer-to-peer quality of service (QoS) in the current internet, and discloses a functional node device with DPIC (deep packet inspection and control) on the premise of not changing original architecture of the internet and being compatible with existing network devices, to solve relatively well main safety problems and quality of service problems. The implemented policy control may perform a particular operation on a certain service, a certain application and a certain user, including realizing a policy processing function similar to a node-level control and network-level scheduling function. This kind of DPIC node devices can be classified into a single node type, a carrier-class network device built-in board card type and a router built-in board card type. Each of these three kinds of devices may be subdivided into four types of a unidirectional DPIC, a bidirectional independent DPIC, a bidirectional dependent DPIC and a peer-to-peer route association. Because the device has a packet inspection capacity for protocols from the second level to the seventh level, user information and application information included in a data stream passing through the device may be detected and identified. The device may be built in a bridge, a transceiver and other devices for wideband access, carrier-class Ethernet, telecom transmission and so on with this function. Applications thereof are mainly located at the position of a gateway in an enterprise network, at an exit of an access network, at the collective level of a metro area network, at an entrance of a province network, at an entrance of a national network and so on. Compared with the existing DPI (deep packet inspection) technologies and product resolutions, differences and advantages of the present disclosure lie in: (1) the existing DPI mainly performs operations on a unidirectional data stream, but the present disclosure may perform deep packet inspection and control (DPIC) in two directions simultaneously; (2) the existing DPIC device is deployed after the internet, so there lacks interaction, interconnection and interoperation capacities among user, network operation maintainer (or ISP) and DPI node; but the present intention considers this demand from the architecture design; (3) one of the purposes of adding the DPI node is to solve or partially solve the problem of "peer-to-peer quality of service (QoS)" of a service, which may be realized by: (a) before a packet leaves the present node to be sent to a next node, an TOS field of an IP header is modified to have a high priority or lower priority according to a service type or an importance level of a user; (b) for a specific service (router built-in board card), it may be forwarded from a specific route with a high priority and good quality of service by routing; (c) for a specific real-time service, in order to guarantee the consistence of time delay jitter, the time delay jitter value is modified on an output-queue before leaving a DPI node, causing the time delay when this kind of packets pass through the present DPIC node to be an approximately constant value.

The main concept of the present disclosure is that, at the first level, a simple deep packet inspection device is added to the existing internet lines (such as at the position of a gateway in an enterprise network, at an exit of an access network, at the collective level of a metro area network, at an entrance of a province network, at an entrance of a national network and so on). A plenty of junk emails (spam) and virus information may be filtered by deeply inspecting L2-L7 overhead bytes and contents of a packet (namely identifying users and applications).

At the second level, stream classification, performance parameters measurement, statistics information report, local resource management, access identity control, content filtering and detection, priority based on policy, service traffic blocking and shaping, establishment and modification of a dynamic rule (policy) or the like are performed.

At the third level, functions of good interaction, interconnection and interworking among user, network operation maintenance (or ISP) or DPI mode are realized. Particularly, the DPIC node is added and controlled by the network operation maintenance (or ISP). The DPIC user may set the DPIC node at any time to allow the DPIC node to obtain its required identification and control capacities for terminal users and various applications. Such identification and control capacities are demonstrated by value-added services and serve for DPI node users.

At the fourth level, in order to solve or partially solve the problem of "peer-to-peer quality of service (QoS) guarantee" of a service, the following functions may be performed: (1) an VIP user is given a high priority when a specific packet is waiting in a queue at the present node; (2) an associated real-time service is given a high priority when a specific packet is waiting in a queue at the present node; (3) before a packet leaves the present node to be sent to a next node, an TOS field of an IP header is modified to have a high priority or lower priority according to a service type or an importance level of a user; (4) for a specific service (the router built-in board card type), it may be forwarded from a specific route with high priority and good quality of service by routing; (5) for a specific real-time service, in order to guarantee the coherence of time delay jitter, the time delay jitter value is modified on an output-queue before leaving a DPI node, causing the time delay when this kind of packets pass through the present DPIC node to be an approximately constant value.

According to one embodiment of the present disclosure, a deep packet inspection and control device is provided for performing real-time traffic management on a real-time packet data stream over an internet. The deep packet inspection and control device comprises: a first rule (entry) table unit for storing a rule table including a first set of rule entries which are pre-defined or generated dynamically; a first scanning unit for receiving a first real-time packet data stream from the internet, and scanning the first real-time packet data stream according to a scanning window defined by the first set of rule entries; a first analysis unit for matching the first real-time packet data stream with the first set of rule entries in the scanning window of the first scanning unit, and outputting a matching result; and a first rule linkage unit for performing linkage control on the first real-time packet data stream to be output back to the internet according to the matching result output from the first analysis unit.

According to another embodiment of the present disclosure, a method of performing real-time traffic management on a real-time packet data stream over an internet using a deep packet inspection and control device is provided. The method comprises: storing, by a first rule table unit of the deep packet inspection and control device, a rule table including a first set of rule entries which are pre-defined or generated dynamically; receiving, by a first scanning unit of the deep packet inspection and control device, a first real-time packet data stream from the internet, and scanning the first real-time packet data stream according to a scanning window defined by the first set of rule entries; matching, by a first analysis unit of the deep packet inspection and control device, the first real-time packet data stream with the first set of rule entries in the scanning window of the first scanning unit, and outputting a matching result; and performing, by a first rule linkage unit of the deep packet inspection and control device, linkage control on the first real-time packet data stream to be output back to the internet according to the matching result output from the first analysis unit.

In the detailed description of exemplary embodiments of the present disclosure below, these and other features as well as advantages will be described. By the detailed description of the exemplary embodiments of the present disclosure below, those skilled in the art will also obviously understand these and other features as well as advantages.

BRIEF DESCRIPTION OF THE DRAWINGS

From the detailed description of embodiments of the present disclosure below with reference to accompanying drawings, these and/or other aspects and advantages of the present disclosure will be more apparent and easier to understand, wherein.

DETAILED DESCRIPTION OF THE PREFERRED EMBODIMENTS

Figure 1:
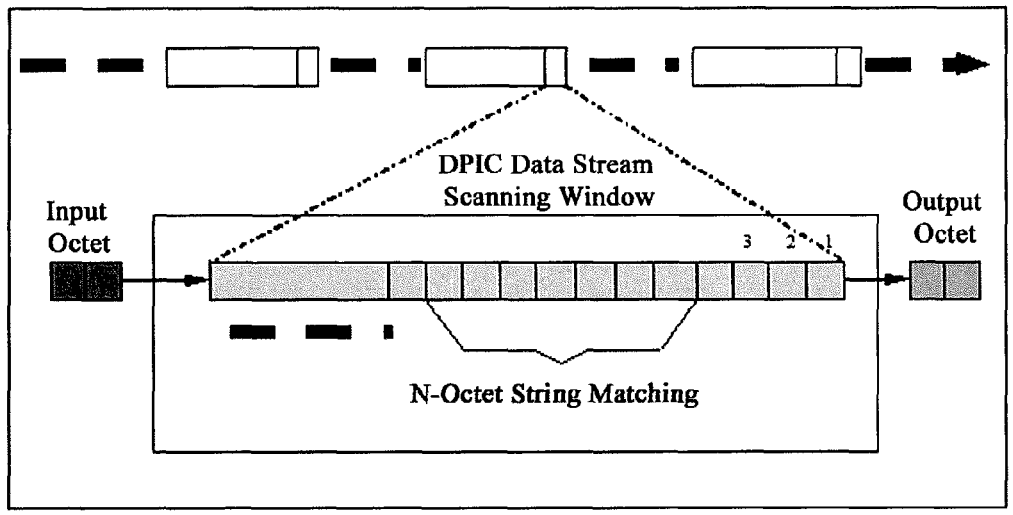
FIG. 1 shows a DPIC data stream window according to an embodiment of the present disclosure.

In order to solve or partially solve the current internet safety problems, node-level control and network-level scheduling as well as peer-to-peer quality of service (QoS) guarantee are difficult matters. The proposed solution plays an active role in the following aspects in the way of smooth evolution and gradual development on the premise of not changing the current internet protocol architecture.

1. On the existing internet line, a simple deep packet inspection device is added, wherein a plenty of packets including junk emails (spam), data packets with virus information and packets related with intrusion event characteristics, which match with a set L2-L7 overhead field information or match with corresponding field in content, may be filtered by deep inspection of the L2-L7 overhead bytes of a packet and content, and the packets. At this level, the difference between the present disclosure and the prior art lies in that the present disclosure inserts respective bidirectional slow channels (Control & Management channel) into two unidirectional DPIC fast channels (data channels), respectively.

2. traffic classification, performance parameters measurement, statistics information report, local resource management, access identity control, content filtering and detection, priority based on policy, service traffic blocking and shaping, dynamic rules establishment and modification or the like are performed. At this level, the difference between the present disclosure and the prior art lies in that for a bidirectional application such as WEB, VOIP, game, search engine, real-time multimedia, instant communication and so on, a dynamic relation of a "rule table" is established by associating functions in two opposite directions through "dual rule entries".

3. Good interaction, interconnection and interworking are made among user, network operation maintenance (or ISP) and DPI node. The DPI node is added and controlled by the network operation maintenance (or ISP). Such control serves for the user. The user may set corresponding functions on the DPI node according to service levels. The function at this level belongs to carrier-class demands and is not included in the prior art.

4. For the in-band mode, a slow channel (namely a control and management information channel) is the same bidirectional route in both of the forward and the backward directions, avoiding the defect that "forward" direction is direct and "backward" direction is a bypass. Control and management of a node device needs no use of the out-band mode, which reduces the cost.

5. It is one of characteristics of the present disclosure that the DPI node device implemented by the present disclosure identifies different users and various applications to realize a function of node-level control and network-level scheduling based on policy by performing deep packet inspection on each packet in a data stream.

6. In order to solve or partially solve the problem of "peer-to-peer quality of service guarantee" of a service, the following may be performed: (1) an VIP user is given a high priority when a specific packet is waiting in a queue at the present node; (2) an associated real-time service is given a high priority when a specific packet is waiting in a queue at the present node; (3) before a packet leaves the present node to be sent to a next node, an TOS field of an IP header is modified to have high priority or lower priority according to a service type or an importance level of a user; (4) for a specific service (the router built-in board card type), it may be forwarded from a specific route with a high priority and good quality of service by routing; (5) for a specific real-time service, in order to guarantee the coherence of time delay jitter, the time delay jitter value is modified on an output-queue before leaving a DPI node, causing the time delay when this kind of packets pass through the present DPIC node to be an approximately constant value. The function at this level belongs to carrier-class demands and is not included in the prior art.

From the above aspects, the current internet safety problem, node-level control and network-level scheduling as well as difficulty of peer-to-peer quality of service (QoS) guarantee may be at least partially solved, alleviating the problems occurred in the current internet development.

In the specification, the following terms are defined:

Deep Packet Inspection and Control (DPIC): It is a real-time traffic management processing function and capacity, aimed at specific field(s) and content of the protocol stack L2 to L7 based on a packet. Once it is found to be matching with the set rule entry (such as an octet string), then according to the set rule, related linkage operation(s) such as filtering, classification, performance measurement, modification, access control traffic blocking and shaping, forward and other control means may be performed.

Deep Packet Inspection (DPI): It is a real-time traffic deep inspection function and capacity, aimed at specific field(s) and content of the protocol stack L3 to L7 base on a packet. Once discovering matching with the set rule entry (such as an octet string), then according to the set rule, related linkage operation(s) such as filtering, classification, performance measurement, modification, access control traffic blocking and shaping, forward and other control means may be performed. The main difference between DPI and DPIC is as described above.

DPIC node: it is a network node device with the DPIC function, which may be a router, a switch, a bridge, a transceiver, an access device, carrier-class Ethernet, a telecom transmission device or the like. The DPIC node may be classified into a single node type and a router built-in type. The single node type includes a unidirectional DPIC type, a bidirectional independent DPIC type, a bidirectional association DPIC type and a peer-to-peer route association type. The router built-in type also has a unidirectional DPIC type, a bidirectional independent DPIC type, a bidirectional dependent DPIC type and a peer-to-peer route dependent type. The location where it is used mainly includes that at a gateway in an enterprise network, at an exit of an access network, at a collective level of a metro area network, at an entrance of a province network, at an entrance of a national network or the like.

DPIC engine: It includes DPIC processing entities with functions of scanning, analysis, rule linkage, rule table and so on.

Rule entry: It is one of a set of rules (N octet character strings), and it is predefined, preset or dynamically generated. It is used for comparing in a specific overhead of a real-time packet data stream or content octet with this set of rules to determine whether there is a match. It may be an identification of a certain application, an identification of a certain user, an identification of a certain service associated with an application and a service, a policy of a certain application, a policy of a user, and an identification generated by a policy of a certain service associated with an application and a service.

DPIC analysis: It is a function implementation for performing comparison between a specific overhead of a real-time packet data stream or content octet and the rule after scanning, to determine what the result is. When the set rule entry is an octet string corresponding to "characteristics of a certain user, a certain application or a certain service", the "analysis function" can identify the "user, application or service" in real time.

Rule linkage: It is a behavior of performing necessary linkage according to an associated rule requirement after the analysis unit. It includes at least:

Stream classification, measurement, statistics information report, management;

Resource management, access control, content filtering and detection;

Priority based on policy, traffic blocking and shaping;

Establishment and modification of a dynamic rule table;

If a certain rule entry is matched, then associated policy control for a packet may be generated (such as forwarding, forwarding after modifying a certain field, encrypting, discarding, charging or the like), including requesting for QoS control or resource control. Policy control may be aimed at a certain service, a certain application and a certain user to perform a particular operation, including realizing a policy processing function similar to a node-level control and network-level scheduling function.

The important features of DPIC include real-time identification of terminal users and various applications, traffic management and processing.

Rule table: It is a rule depository including a plurality of rule entries. These rules are pre-defined and classified according to different levels (may include L2 to L7 and content). It may have different functions at the same level to satisfy carrier-class interworking requirements.

Coordination unit: It is a coordination function unit which performs a bidirectional DPIC function and synergizes between associated applications in both directions. This unit is connected to rule table units, analysis units and rule linkage units in both directions, to deal with correlation between the application in the forward direction and the application in the backward direction of peer-to-peer.

Figure 4:
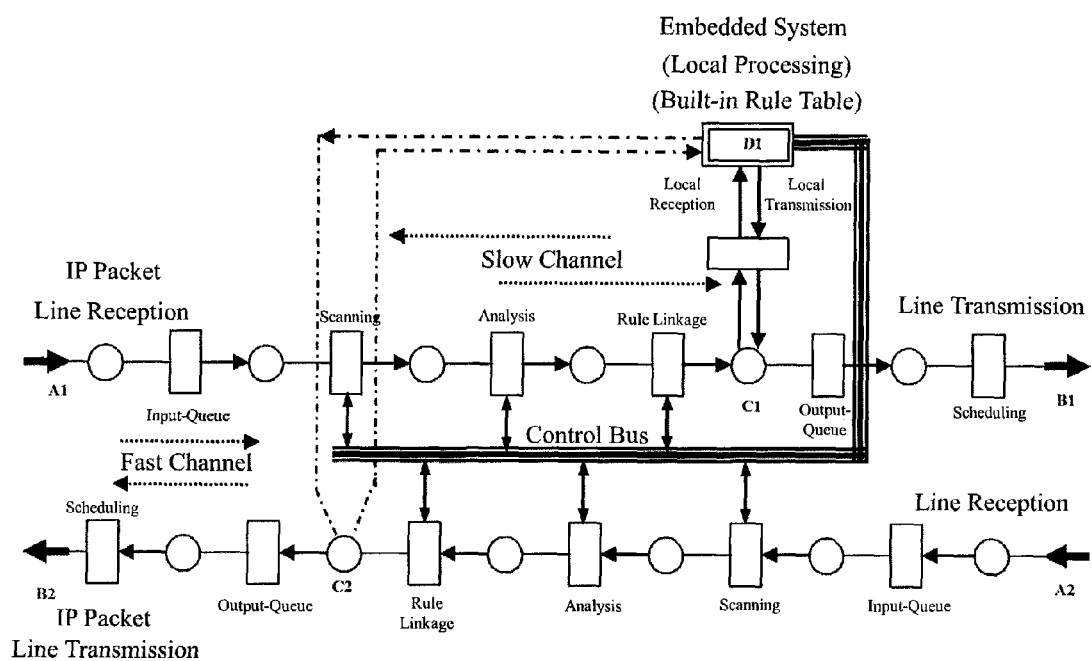
FIG. 4 shows an architecture of a network processor (forwarding engine) when bidirectional DPIC independent of each other is implemented according to an embodiment of the present disclosure.

Fast channel: It is a bidirectional channel for high speed packet transfer and processing, positioned in the network level or above the network level, between a router switch and a router switch, or between a router switch and a DPIC node. It includes a linear processing and forwarding part for a packet in a line card, or a network processor, or a switching unit. In FIG. 4, the transfer channels of data plane information from other network nodes to the DPIC node, from A1 to C1, from A1 to B1, from C1 to B1, from A2 to C2, from A2 to B2, from C2 to B2 and so on all are referred to as the fast channels. In the present disclosure, a fast channel generally needs a micro-engine to accomplish a forwarding function.

Slow channel: It is a bidirectional channel for transferring and processing control plane and network management plane information, positioned in the network level or above the network level, between a router switch and a router switch, or between a router switch and a DPIC node. It includes an embedded system part. In FIG. 4, the transfer channels of control plane and network plane from D1 to C1, from C1 to D1, from D2 to C2, from C2 to D2 all are referred to as the slow channels. In the present disclosure, a slow channel generally needs a StrongARM Core to achieve a calculation and processing function.

Network processor: Positioned in the network level or above the network level, it is a high speed processing unit that achieves a high-speed forwarding function such as header inspection, classification, searching, scheduling or the like within a router switch, or achieves functions of entering a queue, scanning, analysis, rule linkage, leaving a queue, scheduling or the like within a DPIC node. In the present disclosure, although the StrongARM Core is combined with six micro-engines, the network processors in more cases refer to the synergized working parts of the "micro-engine", SDRAM, SRAM, Flash interface unit and so on.

Dual rule entries: for a service such as WEB, VOIP, games, search engine, real-time multimedia, instant messaging and so on, the operations thereof are bidirectional. Although the operational traffic in the two directions is not symmetric, they are highly related in both of the forward and the backward directions, which means a relationship of operating and operated as well as a cause-and-effect relationship. Using the WWW application for example, if an operation request of "clicking" for accessing the network is sent from a certain terminal, then the request goes from A1 to B1 when it passes through the DPIC node shown in FIG. 9, but the response data steam generated by the WWW server to the request is from A2 to B2. For this kind of a bidirectional application, if such a specific application is defined as an operation object of DPIC, then dynamic association between the respective "rule tables" in the two directions may be established. For example, the rule entry (namely matching keywords) in the direction from A2 to B2 may be dynamically added to the "rule table" in the direction from A2 to B2 according to the requirement in the direction from A1 to B1. Conversely, when a certain rule entry is needed to be deleted in the direction from A1 to B1, the corresponding rule entry in the direction from A2 to B2 should also be deleted dynamically. In the present disclosure, the pairing rule entries are referred to as the "dual rule entries". The dual rule entries may be an identification of a certain application, an identification of a certain user, an identification of a certain service associated with an application and a service, a policy of a certain application, a policy of a user, and an identification generated by a policy of a certain service associated with an application and a service.

DPIC Architecture and Functionality:

Currently, the IPv4/IPv6/NGN access network and metro area network generally are constructed by the packet technology. The channel is not transparent for the protocols above the third-level when a bandwidth is rented, and also lacks control capacity to services. These routing and packet switching technologies may know the source IP address, the destination IP address and the TCP port of each packet, but it is difficult for them to determine the behaviors of applications, users and contents as well as other aspects of the upper-level protocols, with a result that the channel rented from the service providers is an opaque or black, cheap channel, in which the safety, credibility and quality of service guarantee are all unknown, possibly leading the users to change to rent from other content providers with the capacity of providing upper-level value-added services. In such case, it would be difficult for the operator to accept it. One of good methods to solve this problem is to change the black channel into a white channel or a somewhat transparent channel by some ways. This will need real-time comparison of overhead bytes and contents of a packet data stream with the rule entry (such as an octet string), for determining whether the characteristics is matched, to increase the visibility of streams, applications and services.

Field matching is an important function in applications, such as IP address searching in a router. In a DPIC node, a window may be set to dynamically observe a packet header and packet content. FIG. 1 is a DPIC data stream window for rule matching. If a character string is used as a rule entry, it is easy for the system to find one or more matching packets (streams). Whether the matching is successful is determined in a DPIC analysis unit. By a certain string matching algorithm, a query result can be obtained per clock cycle.

Figure 2:
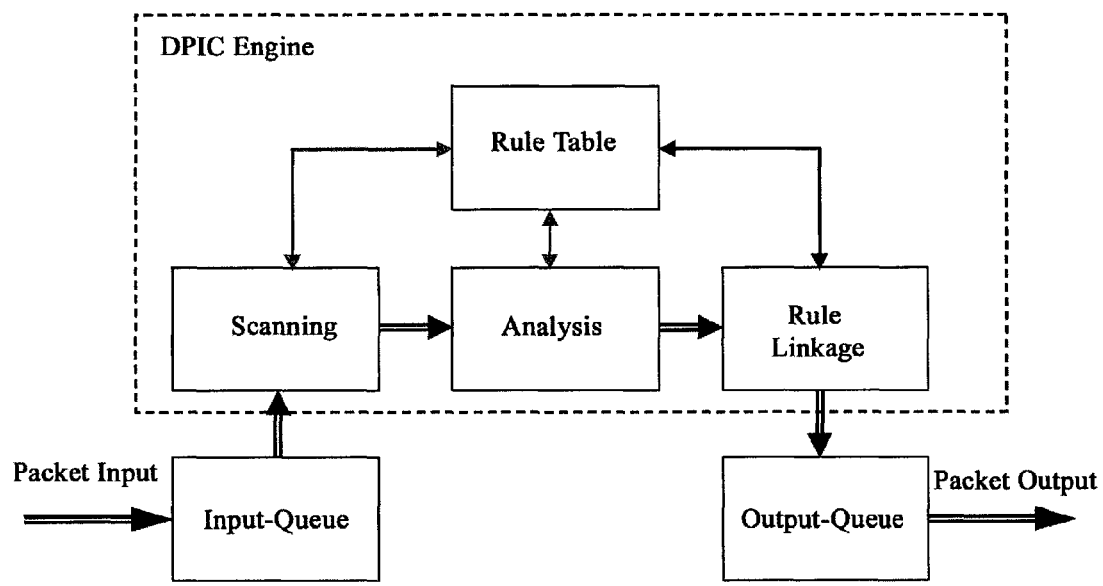
FIG. 2 shows a basic DPIC function and architecture according to an embodiment of the present disclosure.

The basic DPIC functions and architecture are shown in FIG. 2. When a packet is output from a SDH/SONET or an Ethernet (10/100 Mbps, GE, 10 GE) framer, it enters an "input-queue" buffer channel in the network level. The first step is to scan the packet stream by a scanner, and the window width is set according to the actual octet width defined by the rule entry. The second step is to enter the analysis unit, whose operation is to compare specific overhead (L2-L7) and content octet of the real-time packet data stream with the rule, to determine whether they are matching and what the result is. When the set rule entry is an octet string corresponding to "characteristics of a certain user, a certain application or a certain service", the "analysis function" may identify the "user, application or service" in real time. For a bidirectional DPIC, correlation between the forward direction and the corresponding backward direction is to be analyzed, and the result thereof is reported to a coordination unit. Then it enters to the "rule linkage" which is a behavior to perform necessary linkage according to associated rule demands after the analysis unit, and the rule linkage at least includes the following aspects:

Stream classification, measurement, statistics information report, management;

Resource management, access control, content filtering and detection;

Priority based policy, traffic blocking and shaping;

Establishment and modification of a dynamic rule table;

If a certain rule entry is matched, then associated policy control for a packet may be generated (such as forwarding, forwarding after modifying a certain field, encrypting, discarding, charging and so on), including requesting for QoS control or resource control. Policy control may be aimed at a certain service, a certain application and a certain user to perform a particular operation, including realizing a policy processing function similar to a node-level control and network-level scheduling function.

The important features of DPIC include real-time identification of terminal users and various applications and traffic management and processing. The rule table is a rule depository including a plurality of rule entries. These rules are pre-defined and classified according to different levels (may include L2 to L7 and content). It may have different functions at the same level to satisfy the carrier-class interworking requirements. At last, the packet subjected to the operations of the DPIC engine leaves the content channel to flow into the output-queue and goes back to the network again.

Figure 3:
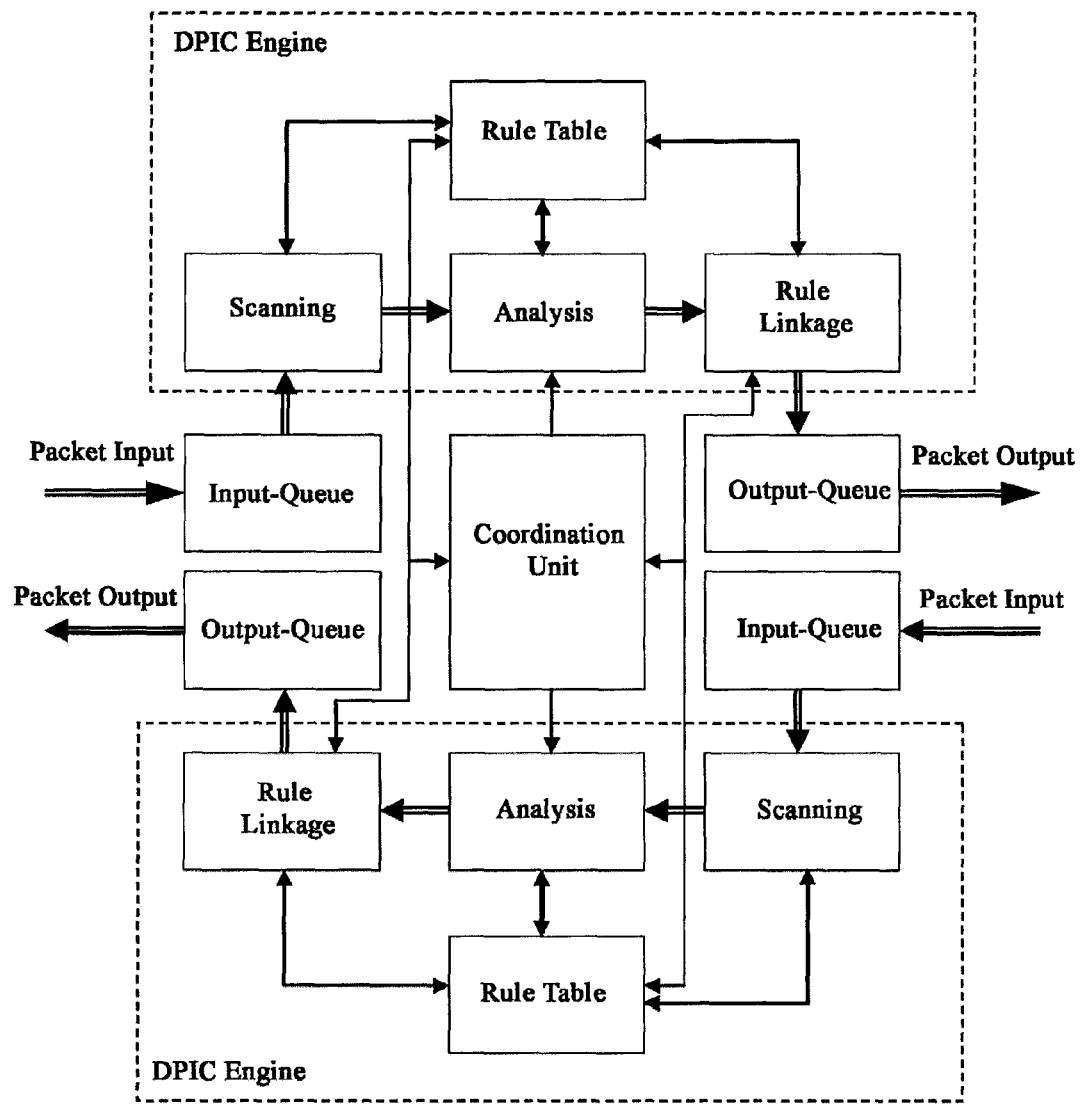
FIG. 3 shows a bidirectional DPIC function and architecture according to an embodiment of the present disclosure.

FIG. 3 is a bidirectional DPIC function and architecture. The difference as compared to FIG. 2 mainly lies in a coordination unit. The DPIC node may be classified into a single node type and a router built-in type. The single node type includes a unidirectional DPIC type, a bidirectional independent DPIC type, a bidirectional dependent DPIC type and a peer-to-peer route dependent type. The router built-in type also has a unidirectional DPIC type, a bidirectional independent DPIC type, a bidirectional dependent DPIC type and a peer-to-peer route dependent type. Here, the coordination unit refers to a coordination function unit to perform a bidirectional DPIC function and synergize between associated applications in the two directions. This unit is connected to rule table units, analysis units and rule linkage units in the two directions respectively, to deal with the correlation between applications in the forward direction from peer to peer and an application in the corresponding backward direction thereof. Here, DPIC in the two directions and the coordination unit should perform jobs at four levels according to FIG. 3.

At the first level, from the unidirectional DPIC, on the existing internet (such as, at a gateway in an enterprise network, at an exit of an access network, at the collective level of a metro area network, at an entrance of a province network, at an entrance of a national network), a simple deep packet inspection device is added. A plenty of packets matching with the set L2-L7 overhead field information or corresponding field in the content can be filtered according to deep inspection of packet L2-L7 overhead bytes and contents. These packets may include junk emails (spam), packets with virus information and packets related to intrusion event characteristics. Some packets with certain characteristics may be discarded by setting, to prevent some illegal users or breaking-rule users from accessing the internet. This function at such a level may be realized on the single node type and the router built-in type. The single node type includes the unidirectional DPIC type device and the bidirectional independent DPIC type device. Of course, it may also be realized on the bidirectional dependent DPIC type and the peer-to-peer rout dependent type.

At the second level, traffic classification, performance parameters measurement, statistics information report, local resource management, access identity control, content filtering and detection, priority based policy, service blocking and shaping, establishment and modification of a dynamic rule and so on are performed. Like the first level, functions at this level may be realized on the single node type and the router built-in type. The single node type includes the unidirectional DPIC type device and the bidirectional independent DPIC type device. Of course, it may also be realized on the bidirectional dependent DPIC type and the peer-to-peer rout dependent type. The first level and the second level belong to the basic functions, and they can be realized on any type of DPIC devices.

At the third level, good interactive, interconnection and interworking mechanisms are achieved among the user, the network operation maintenance (or ISP) and the DPI node. The DPI node is added by the network operation maintenance (or ISP), and controlled by the network operation maintenance (or ISP). The DPI user may set the DPI node at any time to allow the DPI node to obtain required identification and control capacities for terminal users and various applications. Such identification and control capacities are demonstrated by value-added services and serve for DPI node users. The user may set a corresponding function on the DPI node according to a service level. This function may be realized only on the bidirectional dependent DPIC type device and the peer-to-peer route dependent device with the unidirectional node type and the router built-in type.

For the in-band mode, the control and management information channel is a same bidirectional route in the forward and the backward directions, avoiding a defect that "forward"

is direct and "backward" is a bypass. Control and management of the node device need no use of the out-band mode, which reduces the cost.

It is one of characteristics of the present disclosure that the DPI node device implemented by the present disclosure identifies different users and various applications to realize a function of node-level control and network-level scheduling based policy by performing deep packet inspection on each packet in the data stream, and the policy can be set.

At the fourth level, in order to solve or partially solve the problem of "peer-to-peer quality of service guarantee" of a service, the following may be performed: (1) an VIP user is given a high priority when a specific packet is waiting in a queue at the present node; (2) an associated real-time service is given a high priority when a specific packet is waiting in a queue at the present node; (3) before a packet leaves the present node to be sent to a next node, an TOS field of an IP header is modified to have a high priority or lower priority according to a service type or an importance level of a user; (4) for a specific service, (the router built-in board card type), it may be forwarded from a specific route with high priority and good quality of service by routing; (5) for a specific real-time service, in order to guarantee the consistence of time delay jitter, the time delay jitter value is modified on an output-queue before leaving a DPI node, causing the time delay when this kind of packets pass through the present DPIC node to be an approximately constant value. (1), (2) and (3) may be realized on any type of DPIC devices, and (4) and (5) may generally be realized only in the bidirectional dependent DPIC type device and the peer-to-peer route dependent device.

Realizing the unidirectional DPIC type and the bidirectional independent DPIC type devices by a network processor (or forwarding engine).

Because the bidirectional unassociated DPIC type device includes two unidirectional DPIC types, the implementation of the bidirectional unassociated DPIC type device will be described mainly in this section. FIG. 4 is an architecture of a network processor when implementing bidirectional DPIC independent of each other. As shown in the figure, DPIC in two directions are constructed at the same time in the network processor (or forwarding engine). The good interaction among the user, the network operation maintenance (or ISP) and the DPI node is realized by extracting control information of the bidirectional slow channel in the "forward direction" (from the left to the right) and inserting control information of the bidirectional slow channel in the "backward direction" (from the right to the left). After the packet is output from the SDH/SONET or an Ethernet (10/100 Mbps, GE, 19 GE) framer, it enters the "input-queue" buffer channel in the network level, and then passes through, in turn, the scanning unit, the analysis unit and the rule linkage unit (the functions of this unit mainly include that if a certain rule entry is matched, then an associated policy control for a packet may be generated such as forwarding, forwarding after modifying a certain field, encrypting, discarding, charging or the like, including requesting for QoS control or resource control. Policy control may be aimed at a certain service, a certain application and a certain user to perform a particular operation, including realizing a policy processing function similar to a node-level control and network-level scheduling function). The functions of other units have been described above, and the rule table repository (referring to a repository composed of a set of rule entries) is built in the embedded system. Interaction and configuration among these four basic functional units are implemented by the control bus. In order to minimize the time delay jitter, before a packet leaves the present node to be sent to a next node, a TOS field of an IP header is modified by the network processor to have a high priority or lower priority according to a service type or an importance level of a user. For a specific service, the network processor may modify the related route table with other connected routers upstream or downstream, to give a specific route for the specific service. For a specific real-time service, in order to guarantee the coherence of time delay jitter, the time delay jitter value is modified on an output-queue before leaving a DPI node, causing the time delay when this kind of packets pass through the present DPIC node to be an approximately constant value (namely, making the time delay jitter minimum). At last, the packet subjected to the operations of the DPIC engine leaves the content channel to flow into the output-queue and goes back to the network again.

As for the unidirectional DPIC, an IP address (for example, 202.114.209.71, or the like) of the present node may be added in the rule table repository in FIG. 4 as a searching and matching object, namely four octets. From A1 to C1, once the IP address of the packet is found to be matched with it, processing (namely, control signaling and management information processing) of the slow channel (from C1 to D1) is performed at C1 after the rule linkage, and then it is forwarded to the local embedded system D1. When the local embedded system D1 with the signaling or management function needs to send information, the information may also be sent on the slow channel from D1 to C1, and then switched to the fast channel at the connection point C1 after the rule linkage, from C1 to B1. Likewise, the local embedded system D1 may also send the packet from the slow channel to pass through C2 and then switch to the DPI fast channel in the opposite direction (from C2 to B2), or receive local control signaling or network management information from the fast channel (from A2 to C2) to the slow channel (from C2 to D1), as shown by dash line in the vertical direction in FIG. 4. In the case where the present device communicates with other types of network node devices (not shown in FIG. 4) on the left thereof, if the present device receives the routed information Hello from the node on the left thereof, the route begins with the fast channel from the left to the right (from A1 to C1), passing through C1 to switch to the slow channel (from C1 to D1), and then the embedded system of the present device receives the information. When a response is made to the information Hello, the route may be from D1 to C2 and then from C2 to B2. These are the different features of the present disclosure over other existing unidirectional DPI in terms of the architecture design.

Through such features, it is easy to realize interaction and interoperation among the user, the network operation maintenance (or ISP) and the DPI node. Because DPICs in the two directions are operated independently, there is no correlation between the two channels. For the kind of applications like Email (anti-junk emails, counting spam), two unidirectional DP's are enough.

Introduction of the F-Engine DPIC-1 system.

The DPIC-1 uses parallel processing with multiple threads, to achieve the purpose of linear speed deep packet inspection and control. It supports one-way OC-12 POS interface and eight-way adaptive 1-/100M Ethernet interfaces, provides switching capacity of 4 Gbps, has a packet forward rate above 2.5 Mpps with 300 thousand packets processed per second, and supports 400 thousand users.

The whole system of DPIC-1 is composed of a power supply board, a system motherboard and a display board, wherein the power supply board implements the conversion from alternating current to direct current and provides 3.3V, 5V and 12V stable direct current power to the system; and the display board provides device operation indicators including the power supply signal indicator, the POS (STM-4) interface signal indicator, and the eight 10/100M Ethernet interfaces signal indicator which may be replaced with two full duplex GE Ethernet interfaces.

Architecture of hardware of the F-Engine DPIC-1.

Figure 5:
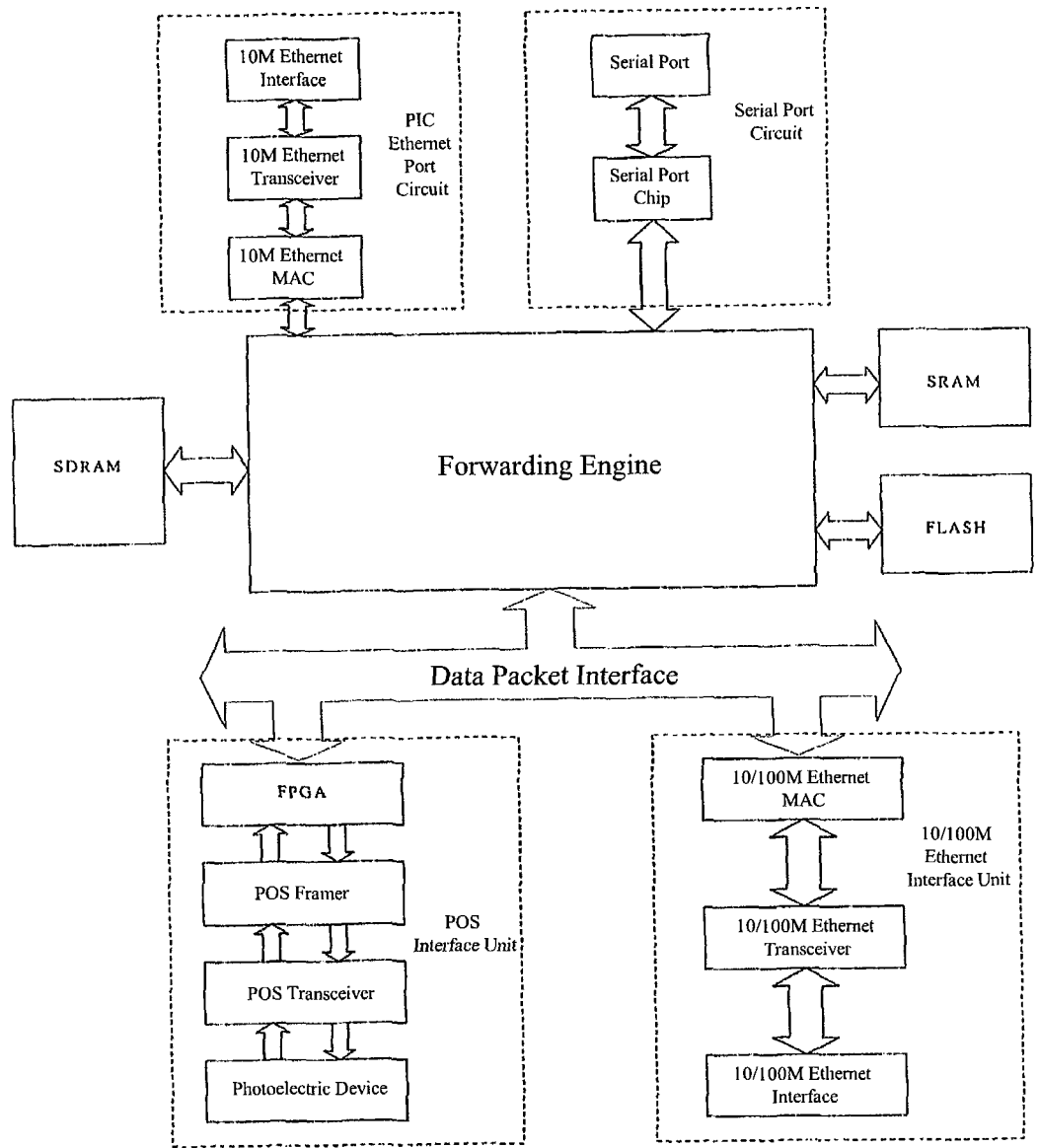
FIG. 5 shows an architecture of hardware of an F-Engine DPIC-1 according to an embodiment of the present disclosure.
Figure 6:
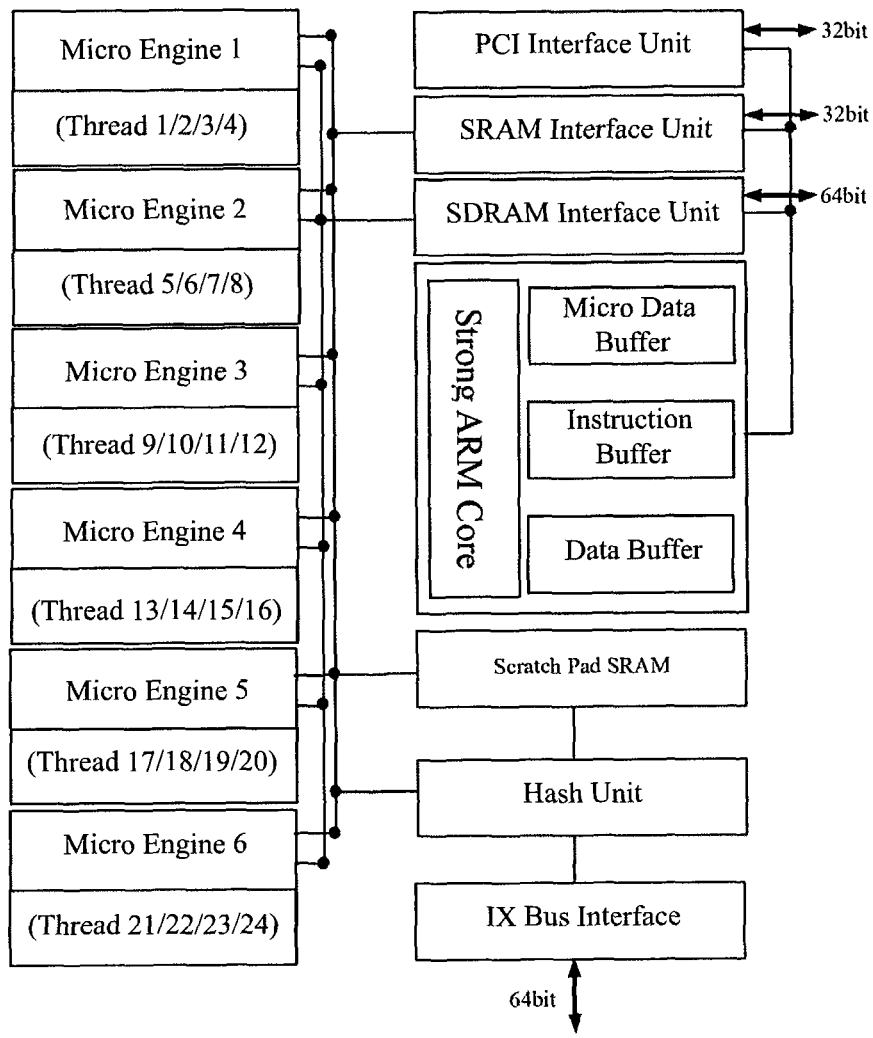
FIG. 6 shows an internal structure of a network processor according to an embodiment of the present disclosure.

The architecture of hardware is shown in FIG. 5. It mainly includes a network processor (forwarding engine), a IXP1200 composed of one processing core StrongARM with a main frequency of 232 MHz and six programmable micro-engines with the RISC (Reduced Instruction Set computing) structure each of which contains four hardware threads, IX Bus of 64 bits (one special but for IXP1200), a SRAM (Static Random Access Memory) interface unit of 32 bits whose working frequency is half of the core frequency, a SDRAM (Dynamic Random Access Memory) interface unit of 64 bits whose working frequency is half of the core frequency, and a PCI bus interface unit of 32 bits with a maximum frequency of 66 MHz.

The calculation architecture of the IXP2000 composed of one StrongARM and six micro-engines includes SRAM, SDRAM, IX Bus, PCI and so on. The Strong ARM and the micro-engines both are RISC processors, each of which operates parallel and independently. The StrongARM is in charge of calculating and processing protocol control and management information (slow channel), and the micro-engine is in charge of the processing related to high speed packet transmission, reception, fast packet observation on the unit of the rule entry, analysis, rule linkage and so on (fast channel). The internet real-time deep packet inspection and control capable of identifying multi-users and multi-applications concurrently occurred (with 1 billion-level Ethernet linear speed) may be realized by allocating micro-code programs with different functions to the six micro-engines/24 hardware threads. Concurrent moving of "real-time object data" may be realized by independent data bus and control bus: bidirectional reading/writing at the same time between the SDRAM/SRAM unit and the micro-engine or the IX BUS unit; reading/writing between the SDRAM unit and the PCI unit; and reading/writing between the IX BUS unit and the micro-engine.

A plurality of IXP1200 processors may be connected to each other via the IX BUS, and thus increase effectively processing capacity and data bandwidth of the processing system. Data interfaces such as ATM, E1/T1, Ethernet MAC and so on may access the IXP1200 via the IX BUS. The storage space for micro-code programs of the micro-engine may be expansible.

Each micro-engine has four programming calculators and supports four hardware threads. Each thread may execute same or different micro-code programs. Thread synchronization is realized by using an internal thread communication mechanism to improve the system efficiency. Micro-code instructions use a multi-pipeline mechanism to calculate per clock cycle.

Each micro-engine uses 256 32-bit registers independently, among which 128 registers forms a transfer register set. Each micro-engine loads data into its own transfer register set, operates on the transfer register set, and then writes to destination of the data through the transfer register set. The micro-engine may accomplish the access within single instruction cycle after the data are loaded into the transfer register set.

The SDRAM and SRAM support a plurality of reading/writing queues to queue with priorities so as to optimize the bandwidth. The StrongARM and six micro-engine/24 threads are allowed to request for reading and writing internal memory unit at the same time, and the reading and writing request are queued with hardware priorities by the memory units according to a specific optimization instruction.

Moving of block data: Each micro-engine allocates a large register set. The moving of block data with 64 bytes may be implemented by a single instruction between functional units. The moving of block data can reduce the scale of micro-code programs, while fully using of calculation resource of the micro-engine.

Network Processor (Forwarding Engine).

The network processor may support a switching capacity of 4 Gbps and provide several kinds of interfaces such as the POS interface, the 10/100M Ethernet interface and the 1 billion-level Ethernet interface.

The network processor mainly performs a series of processings and operations on data packets arriving at network level, and its functions may be classified into three parts: scanning, analysis and rule linkage. The network processor is composed of more than six micro-engines. During the packet processing, these engines will process the packet independently according to a fixed order. Because a pipeline is used, each engine may send the packet to a next engine on the pipeline after it finishes its own task, and thus begin to process a new data packet. Each engine does not need to wait the thread to finish the complete processings for one packet, and it can process the next, new data packet. Thus the execution efficiency is improved significantly.

Each micro-engine has 120 GPR registers, and corresponds to two visiting modes:

Relative address (Reg), each thread accesses 32 registers therein

Absolute address (@Reg), each thread accesses all of 128 transfer registers, which includes 32 registers for reading the SRAM, (SRAM/FBI bus→engine)

32 registers for writing the SRAM, (engine→SRAM/FBI bus)

32 registers for SDRAM ($$) reading, (SDRAM→engine)

32 registers for SDRAM ($$) writing, (engine→SDRAM)

and they are also divided into the absolute address and the relative address, and each thread has 8 for each kind of register on average.

The transfer registers SRAM also may be used for operations of SRAM, R-FIFO, T-FIFO, CSR, Hash Unit and Scratchpad Memory. The SDRAM transfer registers may only be used for operations of the SDRAM. Actually, the relative address register corresponds to a recording packet of each thread, and some certain registers only serve as some temporary variables with no special sense. The absolute address register corresponds to the global variable of each task process.

About Task Partition:

For the micro-engine design, tasks on the micro-engine are partitioned into one reception, one reception scheduling, one transmission scheduling, one for linear speed scanning, one for linear analysis and one for linear speed rule linkage (namely policy control for applications, users and services, activation of QoS control capacity and so on). The reception task only includes a reception module. The reception scheduling includes four modules of reception scheduling, reading registers, from a thread to a core and from a core to a thread. The transmission scheduling includes a transmission scheduling module and a transmission padding module. It is better for the reception scheduling to occupy one micro-engine by its own speculated in materials of IXP1200, because the reception scheduling does not allow other threads to block its operation.

About Communication Mechanisms:

The communication mechanism from a thread to a core is: Interruption+mailbox:

wherein the interruption is to write the Ireg (Interrupt Reason Register), and the mailbox is located in the Scratch memory or SRAM.

The communication mechanism from a core to a thread is: Signal+from core mailbox:

wherein the signal is to write the signal_done CSR register.

About Internal Memory Allocation:

Corresponding to Memory Map of the core, and the SRAM space that micro-codes may access is: 0x1000,0000-0x107F,FFFF. The current configuration is 0x1000,0000-0x101F,FFFF. The SDRAM space that micro-codes may access is: 0xC000,0000-0xC17F,FFFF. The Scratch space that micro-codes may access is: 0xB004,4000-0xB004,4FFF.

The BootROM address space for system booting supports a Flash or EEPROM up to 8 M bytes. This address space may be accessed by the StrongARM core and the micro-engine. After reset, the StrongARM core begins to read instruction therefrom. The StrongARM core must boot from the address 00000000h. The BootROM address space may support a data bus of 16 bits or 32 bits by configuration, which depends on the state of a GPIO [3] pin when reset is performed (it is a bus of 16 bits when the GPIO [3] is set to high, and a bus of 32 bits when the GPIO [3] is set to low). Four external slice-choosing signals (CE # [3:0]) are shared by the BootRAM address space and the SSRAM interface. These signals are generated based on an internal long-word address of 21 bits. Three CE # are configured by the SRAM CSR.

Partition of the FLASH address space is as follows:

| | | | |
|---|---|---|---|
| Diagnosis program: | 0x0 | 0x1FFFF | 128 KB |
| Real-time operation system | 0x20000 | 0x5FFFFF | 8M-128K |
| Reserved space | 0x600000 | 0x7DFFFF | 2M-128K |
| Related configuration | 0x7E0000 | 0x7E1FFF | 16K |
| Product series number, software and FPGA version and encryption information | 0x7e2000 | 0x7e3fff | 16k |
| Circuit board configuration information | 0x7e4000 | 0x7fffff | 96k |

Scanning Unit:

The reception scheduling thread at first detects the state of the reception processing thread, and if the port is available, then continues to check the state of the port. If a packet arrives at the port, then the reception scheduling sends a reception request to a reception state machine. When hardware detects the reception request, it extracts the packet from the designated port at first and puts it in the designated scanning unit, and then sends a reception start signal. When the reception thread receives the signal, it checks whether there is a storage space in the internal memory. If no, it waits until there is an available space, and then begins to receive the packet. If yes, data is read out from the designated unit to be stored in the SDRAM. Meanwhile, the packet header and packet content are scanned according to a rule character string value positioned in the rule register. If the packet is the first one in a certain queue, a related register corresponding to the position of the queue is set to 1, to notify the reception scheduling thread of which queue has packets. The transmission scheduling thread polls the related register. If a value in the register is not 0, the transmission thread allocates the transmission task. The queues with packets are processed one by one. Each queue transmits one packet, and then the next queue is processed. When the transmission thread receives the task and determines that an output port finishes preparation, the packet is extracted from the queue to be transmitted to the transmission unit. The data packet is stored in the SDRAM, and the queue is in the SRAM.

The scheduling principle of the reception scheduling is that: when there is a packet at the port, the reception scheduling thread sends a reception request to the system to designate which reception thread to receive.

The reception scheduling algorithm conforms with the principles as follows:

Tasks are allocated equally to all reception threads;

As long as all ports have packets, they are processed equally, and the case where one port is being processed ceaselessly and packets at other ports keep on waiting will not occur.

Analysis and Rule Linkage:

After the reception scheduling sends the reception request, the packet in the input-queue will enter the reception unit within the network processor from the MAC device port. After the reception unit is filled completely, a signal will be sent to a corresponding thread to have the thread begin to operate. This thread is one of the reception threads. After the thread receives the signal, it reads a register for identifying the reception state at first, and determines whether the received data is error according to the value of the register. If the data is error, the data is discarded and an error processing is performed. It the data is correct, the reception state is stored, and the data is ready to read out from the reception unit to a register. Before actually reading the packet header data, the thread will allocate a SRAM space for the data to store various information of the packet, and allocate a SDRAM space to store the value of the actual IP packet according to the allocated SRAM space address. After setting the SDRAM address for storing the packet header, the thread begins to read out the packet header to a register to perform inspection. It analyzes to determine whether the packet header is matching with the destination field according to the preset rule repository (namely one or more rule entries), and may use a fine matching algorithm and an approximate matching algorithm.

When the IP packet is received, it should be inspected and the value of the first rule entry character string in the rule repository should be extracted. The network processor performs comparison according to the value in the scanning window from begin to end, octet by octet. No matter whether the fine matching algorithm or the approximate matching algorithm is used, at first a relatively fast searching speed should be guaranteed, and times of searching should be guaranteed to have an upper limit. The comparison of several values of several rule entry character strings may be carried out at the same time. Once a certain rule entry character string is found to be matched, then the data packet needs to be recorded at once. Then the specific behaviors and requirements of subsequent operations of the rule entry are observed, and the corresponding rule linkage processing is performed, such as filtering, modification, extraction to the local machine, transfer to the output route and so on. When the set rule entry is an octet string corresponding to "characteristics of a certain user, a certain application or a certain service", the "analysis function" can identify the "user, application or service" real-timely. On this basis, the policy control built in the rule linkage unit may be aimed at a certain service, a certain application and a certain user to perform a particular operation, including realizing a policy processing function similar to a node-level control and network-level scheduling function.

Output-Queue

The IP packet subjected to scanning, analysis and rule linkage will be output in the next step, and the IP packet has already been stored in the PACLET BUFFER of the SDRAM. The function of a queuing program is to put an IP packet in a corresponding output-queue to queue, for scheduling to output by a transmission scheduling program. That queues in the input-queue is not the IP packet itself but an information structure of the IP packet called a packet descriptive structure. The related information of the IP packet may be known by this information structure, such as the actual physical address where the IP packet is stored, the length of the packet and other states. In design of the network processor, there are up to 128 queues to store the packet descriptive structure. These queues are allocated to 16 output ports each of which has 8 queues. An array composed of queue descriptors is allocated in the SRAM. Each queue descriptor is composed of two long words each with 32 bits. The upper 16 bits of the first long words is a pointer directing to the first packet descriptive structure in the queue, and the lower 16 bits thereof is a pointer directing to the last packet descriptive structure in the queue. The packet descriptive structure is stored in the way of the linked list in the queue. The second long word stores a counter to count the amount of packets in the queue. If there is no packet in the queue, then the head pointer of the queue is zero and the counter for the amount of packets is zero.

The packet descriptor is a space allocated in the SRAM and is composed of two long words each with 32 bits. Its allocation is popped (POP) out by a stack structure called FreeList. One packet descriptor will be popped out once a new packet is received. When a packet is forwarded successfully, its packet descriptor should by released, that is, it will be pushed (PUSH) into the stack structure of the FreeList.

The IP packet information recorded in the packet descriptor includes: a pointer directing to a next packet descriptor, the size of the packet, and so on.

The packet descriptors queue in the output queue to have the transmission scheduling arrange to output. However, the packet descriptor is not an actual IP packet, and the transmitted by the transmission thread is the actual packet data. Therefore, a mapping relationship between the packet descriptor and the packet buffer storing the actual packet should be established. A queuing algorithm is an inserting problem of a linked list.

Transmission:

The main job of the transmission part is to send the packet stored in the SDRAM to their respective destination ports. The transmission part has two aspects of jobs: first, to determine a proper thread to send and the packet at which port may be sent, namely the transmission scheduling; second, to find the position of the packet and its destination port, then fill the transmission unit with the data, and notify the transmission state machine to send the data, namely sending the filled data.

The transmission scheduling and sending data are carried out by different threads. Also, fast and slow processings are different. For the transmission part, there are four different kinds of threads: a fast transmission scheduling thread, a fast transmission filling thread, a slow transmission scheduling thread, and a slow transmission filling thread. These threads are independent of each other, but have a synchronization relationship. The two scheduling threads allocate tasks to their respectively controlled transmission filling threads. Actually, the process is performed one by one. For example, when the fast scheduling thread allocates a transmission task of a fast port, the slow scheduling thread will allocate a transmission task subsequently, and then the fast scheduling thread will allocate. They maintain this synchronization mechanism depending on a signal, to guarantee the synchronization on usage of resources. One scheduling thread allocates tasks to its controlled three transmission filling threads sequentially. When it finishes allocating the tasks and the preceding task has been already taken away, the signal is given to the corresponding thread to notify the reception task.

SDRAM (Dynamic Memory):

The SDRAM unit may provide the interface between the IXP1200 and the SDRAM, and support the SDRAM of up to 256 M bytes. Although the speed to access the SDRAM is relatively slow, the SDRAM has a large storage space and a cheap price. Therefore, the SDRAM may be used for storing data structure (such as a data packet, a route table and so on) with large capacity, codes of the operation system when the system operates, and so on. The running frequency of the SDRAM is half of the frequency of the network processor core. The bus cycle is generated by the request from the PCI unit of the network processor. The SDRAM operates according to commands which are placed in a command queue in the SDRAM unit. The SDRAM unit decodes a command, reads and writes data, deletes a command, and so on.

SRAM (Static Memory):

The SRAM unit may provide a general bus interface for several kinds of devices. These devices includes the SSRAM of up to 8 M bytes, the FLASH or E-PROM and so on where the reset StrongARM Core executes codes, the BOOTROM device and other internal memories (such as CAM), an encryption device and a control state interface of a MAC or PHY device. The speed to access the SRAM is relatively fast. However, the SRAM has a small storage space, and is mainly used for storing data structure that needs to be accessed fast such as the look-up table and the buffer descriptor. The network processor may access the SRAM. The external interfaces are composed of a data bus of 32 bits, an address bus of 19 bits and control signal. The working frequency the bus thereof is half of the frequency of the core of the network processor.

As compared to the SDRAM interface, the access delay of the internal memory provided by the SRAM is lower and the speed is quicker. The SRAM is mainly used for providing the loop-up table and for the case when the data is moved by the network processor. The SRAM in the present embodiment is mainly used for storing queue descriptors and packet descriptors.

FLASH (Flash Memory):

The FLASH provides a data bus of 32 bits, and its clock working frequency of half of the core frequency.

The FLASH is a position when the core begins to execute instructions after reset. The built-in programs are firmed and still exist after power off. The address space of network processor supports 8M FLASH, which can be accessed by the core. The FLASH is mapped to the physical address 0 in the core as a starting address. After reset, the core extracts instruction from this address space.

PCI, Ethernet Interface and Serial Port:

The PCI and the Ethernet interface are used for downloading operation system when the operation system is transplanted, performing configuration management, fault management, performance management on the local disc, system test, and so on. Also, they are in charge of service stream management and services such as special signaling. The serial port is in charge of performing on-line configuration on the local disc for debugging and network management.

Figure 7:
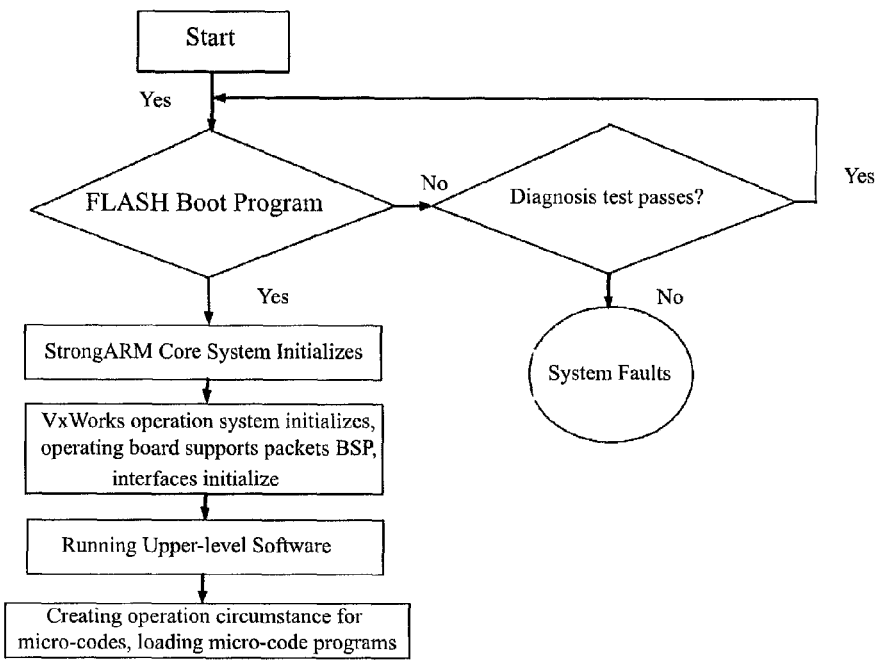
FIG. 7 shows a flow of a system main program according to an embodiment of the present disclosure.

Local Embedded System:

Signaling and network management functions of the local embedded system may be carried out by an embedded CPU- StrongARM Core. Thus the cost can be reduced significantly. FIG. 7 is a flowchart of a main program of the system.

Figure 8:
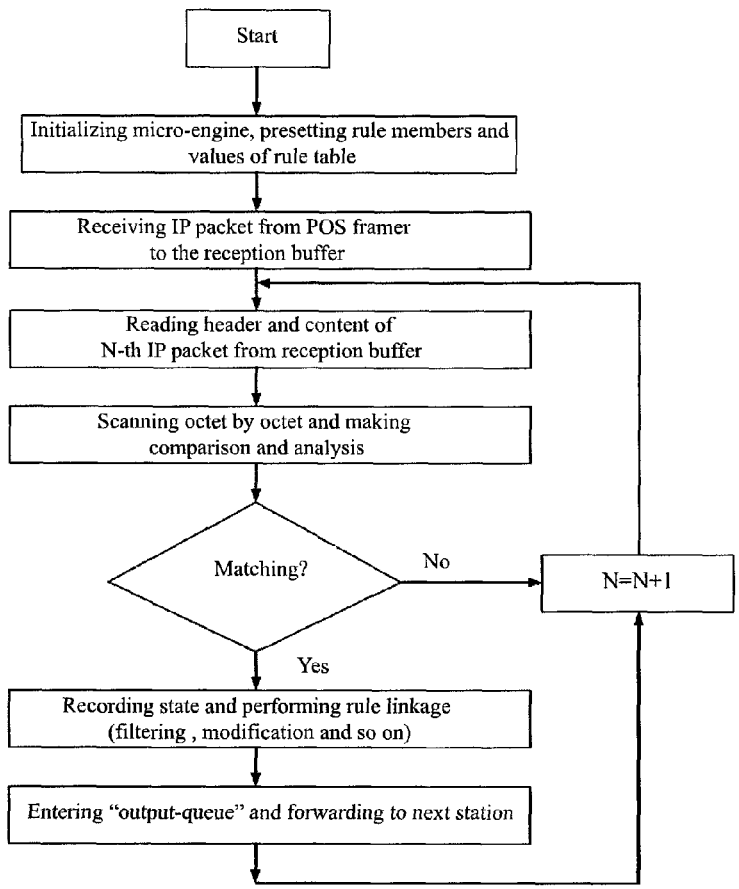
FIG. 8 shows a flowchart implemented by a unidirectional DPIC according to an embodiment of the present disclosure.

System software development includes two aspects. One is system software, control plane software, management plane software, data forwarding plane software and the like on the StrongARM Core. Such softwares need to be developed and run on the embedded operation system Vxworks. The other is micro-code program. This part of software is designed and operates for the six micro-engines, and mainly carries out fast processing functions such as scanning, analysis, and rule linkage of packets. Each micro-engine provides a code storage space of 2 k bytes, and has four hardware threads each of which has its own specific register set. The switching speed of the thread is relatively fast. FIG. 8 is a flowchart of micro-code software of the unidirectional DPI.

Figure 9:
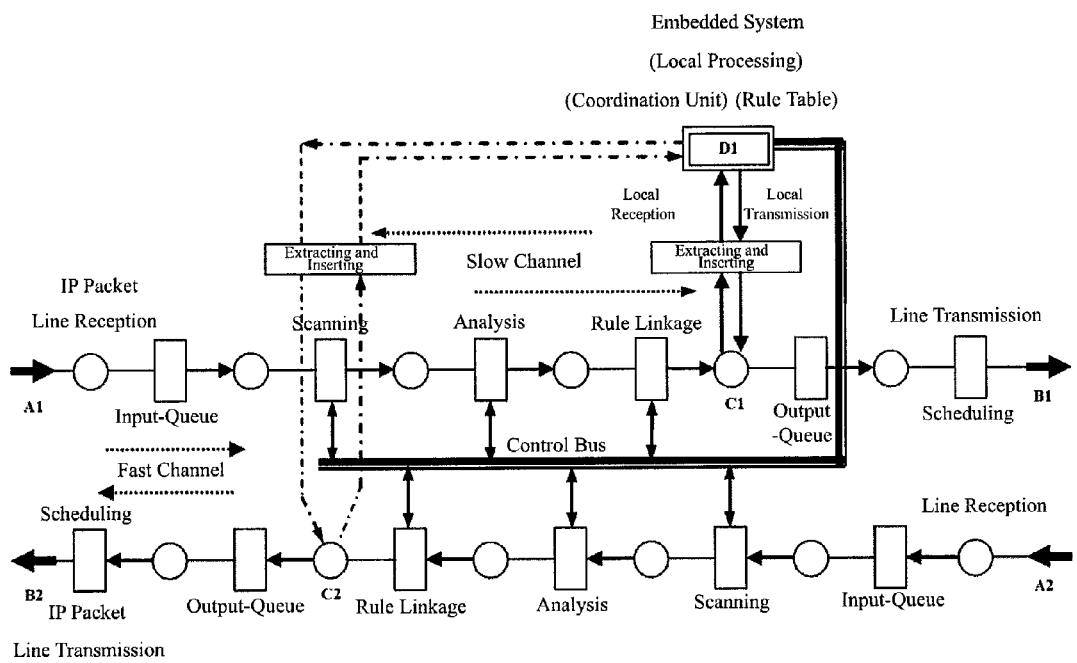
FIG. 9 shows an architecture of a network processor (forwarding engine) when a bidirectional association DPIC is implemented according to an embodiment of the present disclosure.

Realizing Bidirectional Associated DPIC Type Device Using Network Processor:

Two unidirectional DPIC types are included in the bidirectional associated DPIC type device. A coordination unit and a logical function of a rule table are realized by a local embedded system connected to the scanning unit, the analysis unit, and the rule linkage unit, respectively via the control bus. FIG. 9 is decomposition of functions of the network processor when the bidirectional associated DPIC is realized. As shown in the figure, good interaction among the user, the network operation maintenance (or ISP) and the DPI nodes is realized by the extracted bidirectional slow channel (from C1 to D1 and from D1 to C1) in the "forward direction" (from A1 to B1) and inserted bidirectional slow channel (from C2 to D1 and from D1 to C2) in the "backward direction" (from A2 to B2). After the packet is output from the SDH/SONET or Ethernet (10/100 Mbps, GE, 19GE) framer, it enters the "input-queue" buffer channel in the network level, and then sequentially passes through the scanning unit, the analysis unit, and the rule linkage unit, functions of which have been described above. A rule table repository is built in the embedded system. Interaction and configuration of the four basic functional units are carried out by the control bus. On one hand, the network processor achieves the fast channel processing function by the micro-engine. On the other hand, the network processor achieves functions of the control plane and the management plane by the locally embedded StrongARM Core. The tasks of the StrongARM Core further include the coordination unit and the logic function of the rule table. Thus the cost is the minimum. At last, the data packet subjected to the operations of the DPIC engine leaves the content channel to flow into the output-queue and goes back to the network again.

For a service such as WEB, VOIP, games, search engine, real-time multimedia, instant communication, and so on, the operations thereof are bidirectional. Although the operation traffics in the two directions are not symmetric, they are highly related in the forward and the backward directions, which means that they have a relationship of operating and operated as well as a cause-and-effect relationship. Using a WWW application for example, if an operation request of "clicking" for accessing the network is sent from a certain terminal, then the request goes from A1 to B1 when it passes through the DPIC node shown in FIG. 9, but the response data steam generated by a WWW server to the request is from A2 to B2. For this case of a bidirectional application, if such a specific application is defined as an operation object of DPIC, dynamic association between the respective "rule tables" in the two directions may be established. For example, the rule entry (namely keywords) in the direction from A2 to B2 may be dynamically added to the "rule table" in the direction from A2 to B2 according to the requirement in the direction from A1 to B1. Conversely, when a certain rule entry is to be deleted in the direction from A1 to B1, the corresponding rule entry in the direction from A2 to B2 should also be deleted.

In the present disclosure, such pairing rule entries are called "dual rule entries". The dual rule entries are not only to filter some information, but also to do some jobs on classified services. For example, when an important VIP user is found to use a certain service, a policy of a high priority and low time delay may be given for the response direction after the user's request.

In the present example, since the two "rule tables (namely, rule entries)" are generated, added, deleted and modified within the same embedded system, their maintenance and operations are relatively simple.

As for how to solve or partially solve the problem of "peer-to-peer quality of service (QoS) guarantee", the Jitter-Constrained Shaping (JCS) method is proposed by researching the time delay jitter problem caused by data buffering in the traditional traffic shaping algorithm. In process of shaping, the time delay is determined by a filling extent of data buffering and a token output speed. The time delay and the time delay jitter are calculated by on-line detecting the filling extent of data buffering and the token output speed, and then parameters of a shaper are adjusted dynamically according to the time delay jitter constraint, to keep the time delay jitter of the data packet in the process of shaping within the constrained range. The result thereof shows that, as compared to the existing method, in the proposed method, the maximum time delay is reduced from 7.2 ms to 3.6 ms, the minimum time delay is increased from 0.85 ms to 2.27 ms, and the variance of the time delay is decreased from 271.4 to 3.62, effectively reducing the time delay jitter. The particular content can be referred in another patent titled with "a jitter-constrained data buffering shaping method" by Hao Junrui and Yu Shaohua of the Wuhan Fenghuo Network Limited Corporation, July, 2007, which is incorporated in its entire texts herein by reference.

Therefore, through the architecture of the bidirectional associated DPIC (FIG. 9), dual rule entries and dynamic rule tables in the two directions, the following can be realized: (1) an VIP user is given a high priority when a packet is waiting in a queue at the present node; (2) an associated real-time service is given a high priority when a packet is waiting in a queue at the present node; (3) before a packet leaves the present node to be sent to a next node, an TOS field of an IP header is modified to have a high priority or lower priority according to a service type or an importance level of a user; (4) a specific route is given for a specific service by the DPI function on a router node, or the DPI function is added to the existing router node; (5) for a specific real-time service, the time delay when the packet thereof passes through the present DPI node is an approximately constant value (leading to minimum or no time delay jitter minimum). The functions at this level belong to carrier-class demands and are not included in the prior art.

Figure 10:
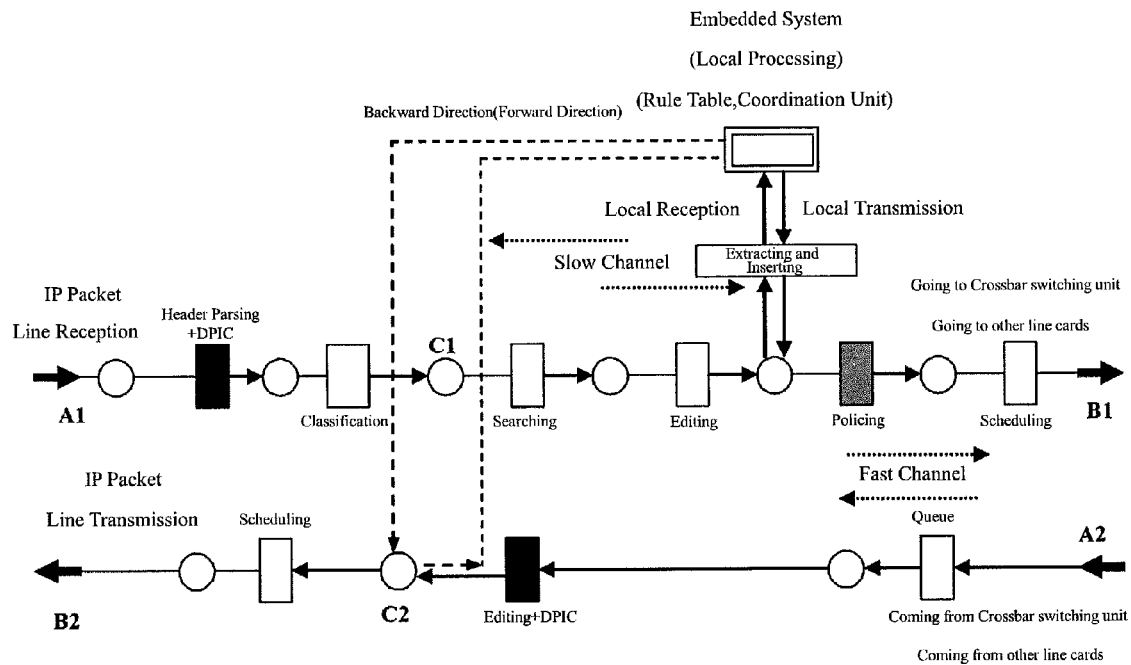
FIG. 10 shows an architecture for implementing a DPIC function on a high speed switching line card and a network processor according to an embodiment of the present disclosure.

As shown in FIG. 10, the bidirectional associated DPIC function may be implemented by upgrading high speed router line card software and affiliated network processor software. In the forward direction, the DPIC function is mainly implemented by expanding the Header Parsing, as shown in the "Head Parsing+DPIC" block in FIG. 10, or by expanding the "Policing" block in the direction from A1 to B1. The Policing block is built in the rule linkage unit and follows the analysis unit. It performs necessary linkage operations according to the associated policy and rule demand. Functions of this fast channel at least includes the following:

Stream classification, measurement, statistics information report, management

Resource management, access control, content filtering and detection

Priority based policy, traffic blocking and shaping

Establishment and modification of a dynamic rule table

If a certain rule entry is matched with, then associated policy control for a packet may be generated (such as forwarding, forwarding after modifying a certain field, encrypting, discarding, charging and so on), including requesting for QoS control or resource control. Policy control may be aimed at a certain service, a certain application and a certain user to perform a particular operation, including realizing a policy processing function similar to a node-level control and network-level scheduling function.

The important features of DPIC lie in real-time identification on terminal users and various applications, and traffic management and processing. They are realized by modifying thread micro-codes for "linear speed rule linkage" in the micro-engine.

In the backward direction from A2 to B2, the DPIC function is mainly implemented by expanding the Editing unit, as shown in the "Editing+DPIC" block in FIG. 10. Note that the real-time and linear processing capacities in the two directions of the network processor should be evaluated before the DPIC function is added, to see how much the overhead of the network processor is after the DPIC function is added. If the resulted system overhead is too much, trade-off should be made.

Additionally, since software and hardware such as network processors, routers and so on are well-known for those skilled in the art and the Wuhan Fenghuo Network Corporation promotes ten thousands of various network devices per year. The associated software and hardware details and particular implementations will not be described in the specification for clarity.

Although exemplary embodiments of the present invention are described in detail herein above, it should be clearly understood that many variations and/or modifications of the basic inventive concepts herein taught which may appear to those skilled in the present art will still fall within the spirit and scope of the present invention, as defined in the appended claims.

What is claimed is:

1. A deep packet inspection and control device for performing real-time traffic management on a real-time packet data stream over an internet comprising:
   a first rule table unit for storing a rule table including a first set of rule entries which are pre-defined or generated dynamically;
   a first scanning unit for receiving a first real-time packet data stream from the internet, and scanning the first real-time packet data stream according to a scanning window defined by the first set of rule entries, wherein the first scanning unit windows data stream of a scanning window defined by the first set of rule entries from the first real-time packet data stream, so as to perform scanning actions on each data stream of the scanning window, a scanning window by a scanning window, to go through the whole first real-time packet data stream;
   a first analysis unit for matching the first real-time packet data stream with the first set of rule entries in the scanning window of the first scanning unit, and outputting a matching result; and
   a first rule linkage unit for performing linkage control on the first real-time packet data stream to be output back to the internet according to the matching result output from the first analysis unit.

2. The deep packet inspection and control device according to claim 1 further comprising:
   a second rule table unit for storing a rule table including a second set of rule entries which are pre-defined or generated dynamically;
   a second scanning unit for receiving a second real-time packet data stream from the internet, and scanning the second real-time packet data stream according to a scanning window defined by the second set of rule entries, wherein the second scanning unit windows data stream of a scanning window defined by the second set of rule entries from the second real-time packet data stream, so as to perform scanning actions on each data stream of the scanning window, a scanning window by a scanning window, to go through the whole second real-time packet data stream;
   a second analysis unit for matching the second real-time packet data stream with the second set of rule entries, and outputting a matching result; and
   a second rule linkage unit for performing linkage control on the second real-time packet data stream to be output back to the internet according the matching result output from the second analysis unit,
   wherein the first real-time packet data stream is a data stream in a forward direction in the internet, and the second real-time packet data stream is a data stream in a backward direction opposite to the forward direction in the internet.

3. The deep packet inspection and control device according to claim 2, wherein the linkage control of the first rule linkage unit or the second rule linkage unit includes at least one of:
   stream classification, measurement, statistics information report;
   resource management, access control, content filtering and detection;
   priority based on policy, traffic blocking and shaping;
   establishment and modification of a dynamic rule table; and
   generating related strategic control for a data packet if the data packet matches with a specific rule entry, wherein the strategic control performs particular operations on a specific service, application or user.

4. The deep packet inspection and control device according to claim 1, wherein the deep packet inspection and control device gives a high priority to a Very Important Person ("VIP") user.

5. The deep packet inspection and control device according to claim 1, wherein the deep packet inspection and control device gives a high priority to an associated real-time service.

6. The deep packet inspection and control device according to claim 1, wherein before a packet leaves a present node to be sent to a next node, the deep packet inspection and control device modifies a Type of Service ("TOS") field of an Internet Protocol ("IP") header of the packet according to a service type or an importance level of a user, causing it to have a high priority or a lower priority.

7. The deep packet inspection and control device according to claim 1, further comprising:
   a first input-queue for buffering a packet in the first real-time packet data stream from the internet, and outputting the packet to the first scanning unit; and a first output-queue for buffering the first real-time packet data stream subjected to the linkage control by the first rule linkage unit, and outputting it to the internet.

8. The deep packet inspection and control device according to claim 7, further comprising:

a second input-queue for buffering a packet in the second real-time packet data stream from the internet, and outputting the packet to the second scanning unit; and a second output-queue for buffering the second real-time packet data stream subjected to the linkage control by the second rule linkage unit, and outputting it to the internet.

9. The deep packet inspection and control device according to claim 1, wherein the deep packet inspection and control device is of a single node type.

10. The deep packet inspection and control device according to claim 1, wherein the deep packet inspection and control device is built in a router.

11. A method of performing real-time traffic management on a real-time packet data stream over an internet using a deep packet inspection and control device, comprising:

storing, by a first rule table unit of the deep packet inspection and control device, a rule table including a first set of rule entries which are pre-defined or generated dynamically;

receiving, by a first scanning unit of the deep packet inspection and control device, a first real-time packet data stream from the internet, and scanning the first real-time packet data stream according to a scanning window defined by the first set of rule entries, wherein the first scanning unit windows data stream of a scanning window defined by the first set of rule entries from the first real-time packet data stream, so as to perform scanning actions on each data stream of the scanning window, a scanning window by a scanning window, to go through the whole first real-time packet data stream;

matching, by a first analysis unit of the deep packet inspection and control device, the first real-time packet data stream with the first set of rule entries in the scanning window of the first scanning unit, and outputting a matching result; and performing, by a first rule linkage unit of the deep packet inspection and control device, linkage control on the first real-time packet data stream to be output back to the internet according to the matching result output from the first analysis unit.

12. The method according to claim 11, further comprising:

storing, by a second rule table unit of the deep packet inspection and control device, a rule table including a second set of rule entries which are pre-defined or generated dynamically;

receiving, by a second scanning unit of the deep packet inspection and control device, a second real-time packet data stream from the internet, and scanning the second real-time packet data stream according to a canning window defined by the second set of rule entries, wherein the second scanning unit windows data stream of a scanning window defined by the second set of rule entries from the second real-time packet data stream, so as to perform scanning actions on each data stream of the scanning window, a scanning window by a scanning window, to go through the whole second real-time packet data stream;

matching, by a second analysis unit of the deep packet inspection and control device, the second real-time packet data stream with the second set of rule entries, and outputting a matching result; and performing, by a second rule linkage unit of the deep packet inspection and control device, linkage control on the second real-time packet data stream to be output back to the internet according the matching result output from the second analysis unit, wherein the first real-time packet data stream is a data stream in a forward direction in the internet, and the second real-time packet data stream is a data stream in a backward direction opposite to the forward direction in the internet.

13. The method according to claim 11, wherein the linkage control of the first rule linkage unit or the second rule linkage unit includes at least one of stream classification, measurement, statistics information report;

resource management, access control, content filtering and detection;

priority based on policy, traffic blocking and shaping;

establishment and modification of a dynamic rule table; and generating related strategic control for a data packet if the data packet matches with a specific rule entry, wherein the strategic control performs particular operation on a specific service, application or user.

14. The method according to claim 11, wherein the linage control comprises giving a high priority to a VIP user.

15. The method according to claim 11, wherein the linkage control comprises giving a high priority to a relevant real-time service.

16. The method according to claim 11, wherein the linkage control comprises before a packet leaves a present node to be sent to a next node, modifying a TOS field of an IP header of the packet according to a service type or an importance level of a user, causing it to have a high priority or a lower priority.

17. The method according to claim 11, further comprising buffering, by a first input-queue of the deep packet inspection and control device, a packet in the first real-time packet data stream from the internet, and outputting the packet to the first scanning unit; and buffering, by a first output-queue of the deep packet inspection and control device, the first real-time packet data stream subjected to the linkage control by the first rule linkage unit, and outputting it to the internet.

18. The deep packet inspection and control device according to claim 17, further comprising:

buffering, by a second input-queue of the deep packet inspection and control device, a packet in the second real-time packet data stream from the internet, and outputting the packet to the second scanning unit; and buffering, by a second output-queue of the deep packet inspection and control device, the second real-time packet data stream subjected to linkage control by the second rule linkage unit, and outputting it to the internet.

19. The method according to claim 11, wherein the deep packet inspection and control device is of a single node type.

20. The method according to claim 11, wherein the deep packet inspection and control device is built in a router.

* * * * *